(12) United States Patent
Yaqoob et al.

(10) Patent No.: US 8,525,998 B2
(45) Date of Patent: Sep. 3, 2013

(54) OPTICAL PHASE PROCESSING IN A SCATTERING MEDIUM

(75) Inventors: Zahid Yaqoob, Cambridge, MA (US); Emily McDowell, Pasadena, CA (US); Changhuei Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 219 days.

(21) Appl. No.: 12/886,320

(22) Filed: Sep. 20, 2010

(65) Prior Publication Data

US 2011/0001980 A1 Jan. 6, 2011

Related U.S. Application Data

(62) Division of application No. 11/868,394, filed on Oct. 5, 2007, now abandoned.

(60) Provisional application No. 60/850,356, filed on Oct. 6, 2006.

(51) Int. Cl.
*G01B 9/021* (2006.01)

(52) U.S. Cl.
USPC .................. 356/432; 356/457; 359/31; 606/1

(58) Field of Classification Search
USPC .................. 356/457; 606/1–19; 359/10, 11, 359/15, 16, 27, 31
See application file for complete search history.

(56) References Cited

U.S. PATENT DOCUMENTS

| | | | |
|---|---|---|---|
| 4,750,153 A | 6/1988 | Owechko et al. | |
| 4,866,781 A | 9/1989 | Borken et al. | |
| 4,928,695 A | 5/1990 | Goldman et al. | |
| 5,120,133 A | 6/1992 | Sica, Jr. | |
| 5,548,419 A * | 8/1996 | Adrian et al. | 359/24 |
| 5,557,431 A * | 9/1996 | Pepper | 359/10 |
| 5,760,388 A | 6/1998 | Swandic | |
| 5,793,504 A | 8/1998 | Stoll | |
| 6,496,262 B1 * | 12/2002 | Meng et al. | 356/457 |
| 6,808,523 B2 * | 10/2004 | Fujisaka et al. | 606/10 |
| 2002/0057486 A1 | 5/2002 | Tanaka | |
| 2004/0125380 A1 | 7/2004 | Pepper | |

OTHER PUBLICATIONS

B. Y. Zel'dovich et al., "Connection Between Wave Fronts of Reflected and Exciting Light in Stimulated Mandelshtam-Brillouin Scattering," Jetp Letters-Ussr, vol. 15, No. 3, pp. 109-113 & 255, 1972.

(Continued)

*Primary Examiner* — Gregory J Toatley
*Assistant Examiner* — Rebecca C Bryant
(74) *Attorney, Agent, or Firm* — Gates & Cooper LLP

(57) ABSTRACT

An optical phase processing system for a scattering medium. A first beam has a direction and a wavefront and the first beam is configured to enter a holographic recording medium. A scattering medium is illuminated by a signal beam generating at least one scattered beam. An interference pattern is recorded from the at least one scattered beam and the first beam. A second beam is generated in a direction opposite to the direction of the first beam, the second beam having a wavefront and a phase substantially opposite to a phase of the wavefront of the first beam, and the second beam is configured to enter the holographic recording medium. The second beam and the interference pattern interact to generate at least one reconstructed beam having a phase substantially opposite to a phase of the at least one scattered beam, and the at least one reconstructed beam is configured to be viewable through the scattering medium.

20 Claims, 13 Drawing Sheets

(a)

(b)

(56) References Cited

OTHER PUBLICATIONS

P. Gunter, "Holography, Coherent-Light Amplification and Optical-Phase Conjugation with Photorefractive Materials," Physics Reports-Review Section of Physics Letters, vol. 93, No. 4, pp. 199-299, 1982.

P. Gunter, "Holography, Coherent Image-Enhancement and Optical-Phase Conjugation with Photoreactive Materials," Helvetica Physica Acta, vol. 55, pp. 571, 1982.

O. Y. Nosach et al, "Cancellation of Phase Distortions in an Amplifying Medium with a Brillouin Mirror," Jetp Letters, vol. 16, pp. 435-438, 1972.

R. W. Hellwarth, "Generation of time-reversed wave fronts by non-linear refraction," Journal of Optical Society of America, vol. 67, No. 1, pp. 1-3, 1977.

A. Yariv et al., "Amplified reflection, phase conjugation, and oscillation in degenerate four-wave mixing," Optics Letters, vol. 1, No. 1, pp. 16-18, 1977.

F. Charra et al., "Nondegenerate Multiwave Mixing in Polydiacetylene—Phase Conjugation with Frequency Conversion," Journal of the Optical Society of America B-Optical Physics, vol. 8, No. 3, pp. 570-577, 1991.

C. Yang, "Harmonic phase based low coherence interferometry: A method for studying the dynamics and structures of cells," Massachusetts Institute of Technology, Chapters 10 and 11, pp. 2-11 and 193-221, 2001.

G. J. Dunning et al., "Phase Conjugate Propagation Study," Oct. 1994 Final Report (Jan. 1992-Dec. 1993), 59 pages.

R. A. Mullen et al., "High Brightness Diode Lasers for Blue-Green Applications," Mar. 1990 Final Report (Dec. 31, 1998-Aug. 31, 1989), 52 pages.

International Search Report mailed Aug. 31, 2011, International application No. PCT/US2010/056274, International filed Nov. 10, 2010.

* cited by examiner

OPTICAL PHASE PROCESSING IN A SCATTERING MEDIUM

CROSS-REFERENCE TO RELATED APPLICATIONS

This application is a divisional application of Ser. No. 11/868,394, filed on Oct. 5, 2007, entitled "Optical Phase Processing in a Scattering Medium," by Zahid Yaqoob, Emily McDowell and Changhuei Yang, which Application claims priority to U.S. Provisional Application No. 60/850,356; filed Oct. 6, 2006; titled "Turbidity Elimination using Optical Phase Conjugation and its Applications."

STATEMENT REGARDING FEDERALLY SPONSORED RESEARCH OR DEVELOPMENT

This invention was funded by the United States government. The U.S. Government has certain rights in this invention pursuant to Grant No. BES-0547657 awarded by the National Science Foundation. References cited within this application, including patents, published patent applications other publications, and U.S. Provisional Application No. 60/850,356; filed Oct. 6, 2006 are hereby incorporated by reference in their entirety.

INCORPORATION BY REFERENCE

References cited within this application, including patents, published patent applications other publications, and the U.S. Provisional Application No. 60/850,356; filed Oct. 6, 2006, are hereby incorporated by reference in their entirety.

THE NAMES OF THE PARTIES TO A JOINT RESEARCH AGREEMENT

Not applicable.

BACKGROUND

1. Field

This disclosure is generally related to optical phase manipulation and in particular to optical phase processing in a scattering medium.

2. Description of Related Art

Optical phase conjugation (OPC) is an optical phenomenon, which typically uses a nonlinear optical interaction to substantially reverse the phase of optical wavefront and the direction of propagation of an arbitrary incident light beam. Therefore, a phase conjugated beam travels in a direction opposite to that of an original beam while retracing the phase of the original beam. Several methods exist for OPC, e.g., static holography, real-time holography, stimulated scattering, four-wave mixing, and six-wave mixing. OPC has found several applications, which include high-resolution imaging, lens-less imaging, laser resonators, pulse compression, high energy laser systems, adaptive optics, crystal fiber-optics, spectroscopy, etc. In certain media, such as in biological tissues, scattering is typically several times stronger than absorption. Scattering presents a hurdle to simple viewing through tissues due to severe distortion of the wavefront of an incident light beam. Therefore, obtaining a view inside or through such media is difficult. Similarly, the scattering phenomenon also prevents concentrating or effective delivery of optical energy at preferred locations within such media. Therefore, systems and methods that can alleviate the above-mentioned ill effects of light scattering are desirable in a number of industrial, defense, and healthcare applications.

BRIEF SUMMARY

Embodiments of the present disclosure provide a system and method for processing an optical phase in a scattering medium. Briefly described, in architecture, one embodiment of the system, among others, can be implemented as follows. The system includes a first beam having a direction and a wavefront. The first beam is configured to enter a holographic recording medium such as a photorefractive crystal. A scattering medium is illuminated by a signal beam generating at least one scattered beam. An interference pattern, such as a hologram, is recorded inside the holographic recording medium from the at least one scattered beam in the presence of the first beam. A second beam with a wavefront that is conjugate, or phase reversed, of that of the first beam is generated substantially in a direction opposite to the direction of the first beam, and the second beam is configured to enter the holographic recording medium. The second beam and the already recorded interference pattern interact to generate at least one reconstructed beam having a phase substantially opposite to a phase of the at least one scattered beam and the at least one reconstructed beam is configured to be viewable through the scattering medium.

The present disclosure can also be viewed as providing a method of performing optical phase processing. The method may include generating a first beam having a direction and a wavefront, configuring the first beam to enter a holographic recording medium, illuminating a scattering medium by a signal beam, and generating at least one scattered beam. The method may further include recording an interference pattern from the at least one scattered beam, generating a second beam substantially in a direction opposite to the direction of the first beam, the wavefront of the second beam being substantially conjugate of that of the first beam, and configuring the second beam to enter the holographic recording medium. The method may also include causing the second beam and the interference pattern to interact to generate at least one reconstructed beam having a phase substantially opposite to a phase of the at least one scattered beam, and rendering the at least one reconstructed beam to be viewable through the scattering medium.

Other systems, methods, features, and advantages of the present disclosure will be, or will become apparent, to a person having ordinary skill in the art upon examination of the following drawings and detailed description. It is intended that all such additional systems, methods, features, and advantages included within this description, be within the scope of the present disclosure, and be protected by the accompanying claims.

BRIEF DESCRIPTION OF THE SEVERAL VIEWS OF THE DRAWINGS

Many aspects of the disclosure can be better understood with reference to the following drawings. Components in the drawings are not necessarily to scale, emphasis instead being placed upon clearly illustrating principles of the present disclosure. Moreover, in the drawing, like-referenced numerals designate corresponding parts throughout the several views.

DETAILED DESCRIPTION

The present disclosure relates to a system and method for processing phase of an optical wavefront. Specifically, the system and method may be used to make an arrangement, for example, capable of viewing, displaying, and targeting objects included in, or adjacent to, a scattering medium which scatters light.

Figure 1:
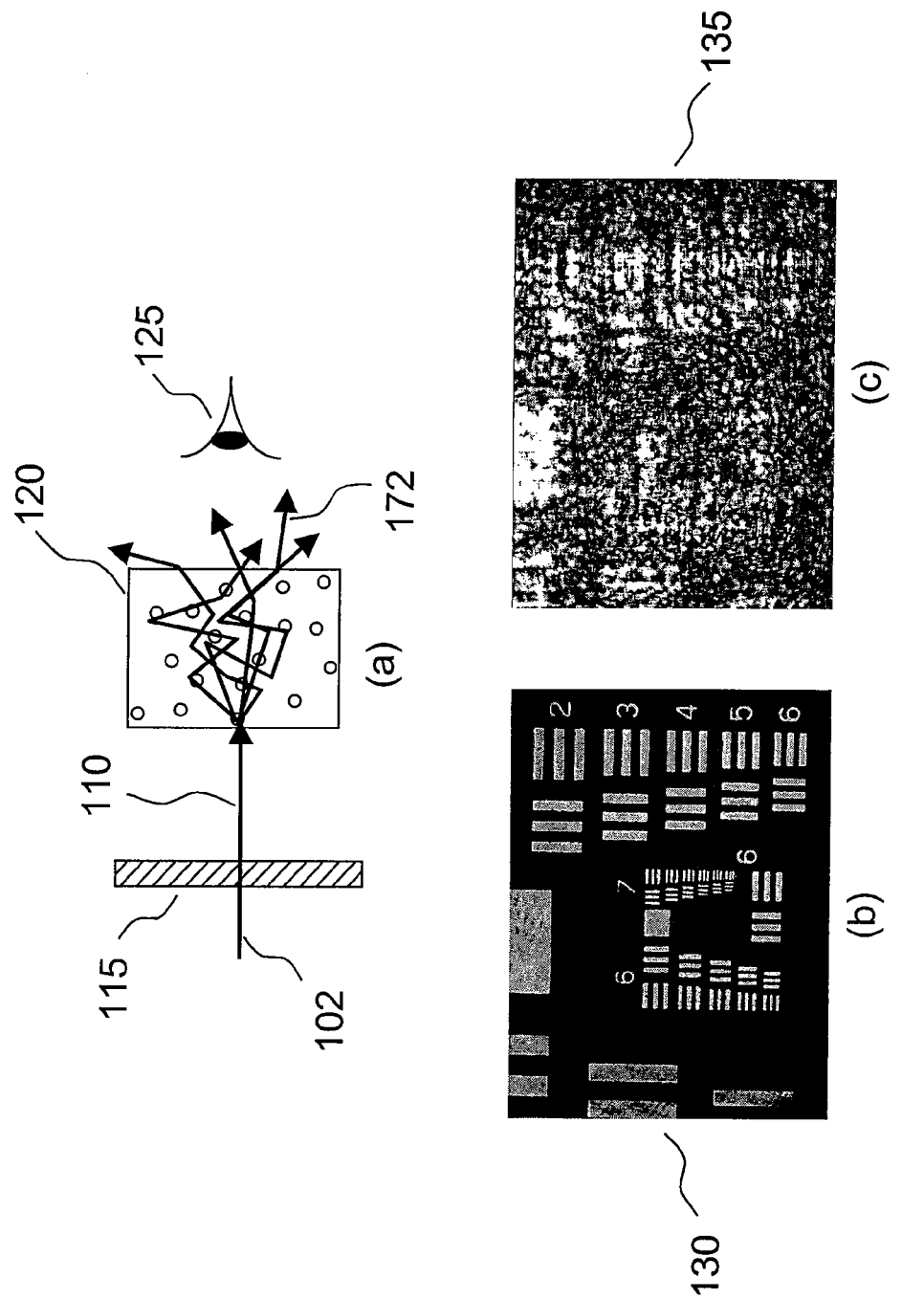
FIG. 1(a) illustrates an illustrative target arranged with a scattering medium wherein a signal beam is entering the scattering medium.
FIG. 1(b) illustrates an image of the illustrative target through a non-scattering medium.
FIG. 1(c) illustrates a distorted image of the illustrative target caused by scattering.

FIG. 1(a) shows an incoming beam 102 going through an illustrative target 115. A target is not required for the claimed system or method to perform. The illustrative target has been included merely to show a commonly used element applied in the art and to demonstrate concepts pertinent to the systems and the methods. Also shown is a signal beam 110 entering a scattering medium 120. At least one scattered beam 172 is reaching a viewer 125.

The illustrative target 115 is similar to a stencil in construction. The illustrative target 115 has a metallic layer removed in several shapes, such as rectangular bars, and of several dimensions and is commonly used in the field of the art of imaging. FIG. 1(b) shows an image 130 of the illustrative target 115 without being subjected to scattering.

FIG. 1(c) is an image 135 of the target 115 distorted due to scattering. As an example, scattering is about ten times or even more strong than absorption in a biological tissue making it difficult to see through or focus light at a desired location inside the biological tissue.

Figure 2:
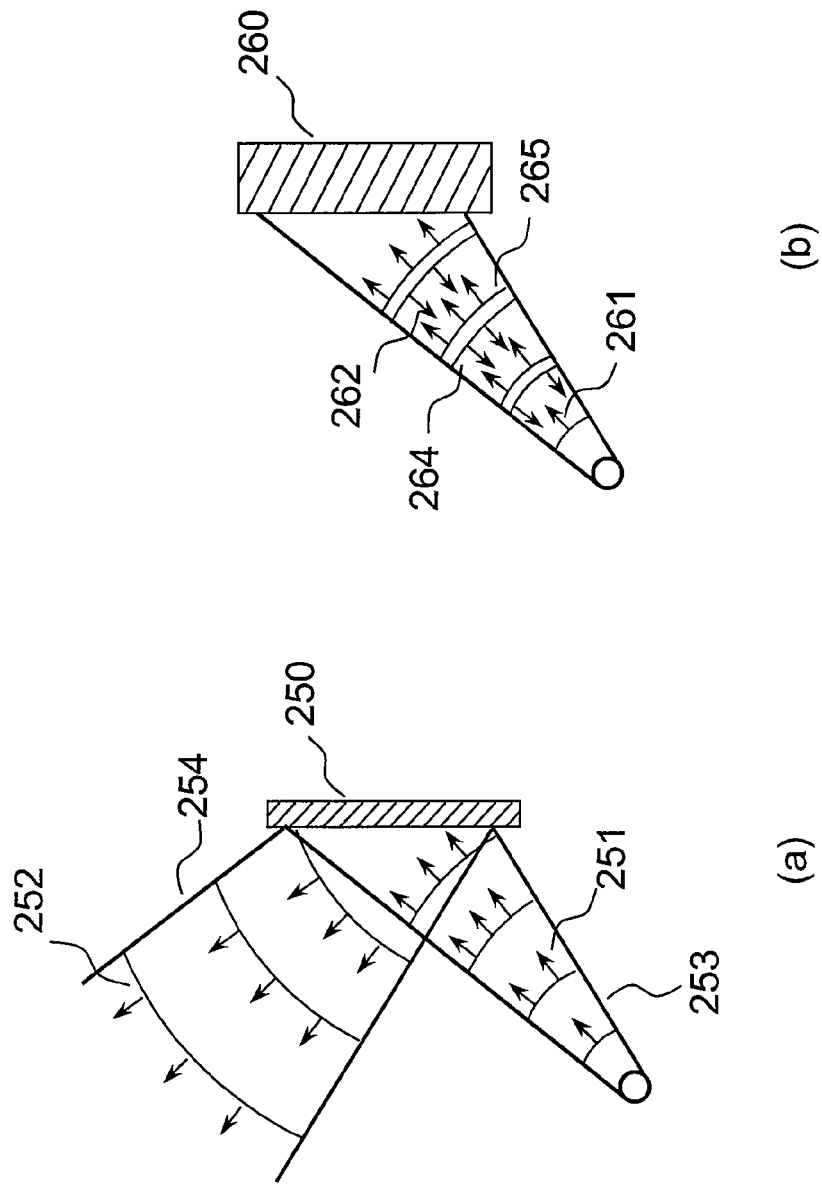
FIG. 2(a) illustrates a behavior of a conventional mirror.
FIG. 2(b) illustrates a behavior of a phase conjugate mirror.

FIG. 2(a) illustrates a behavior of a conventional mirror 250. An incident beam 253 has a direction 251 indicated by arrow and a wavefront specified by a curved line 252. The incident beam reflects from the conventional mirror 250, according to Snell's law, resulting into a reflected beam 254 having a direction at an angle obtained from Snell's law. There is no perturbation caused in the wavefront 252 after reflection from a conventional mirror 250.

FIG. 2(b) illustrates a behavior of a phase conjugate mirror (PCM) 260. In a holographic setup, a conjugate reference beam, also termed second beam below, and a holographic recording medium such as a photorefractive crystal constitute a PCM 260. Incident beam having a direction 261 is reflected in a substantially opposite direction indicated by arrow 262. The wavefront 264 of the returning beam is substantially equal and opposite to the wavefront 265 of the beam incident on the PCM 260. In other words, the PCM 260 generates a beam which travels in a direction opposite to that of a beam incident on the PCM while retracing the phase of the beam incident on the PCM.

Figure 3:
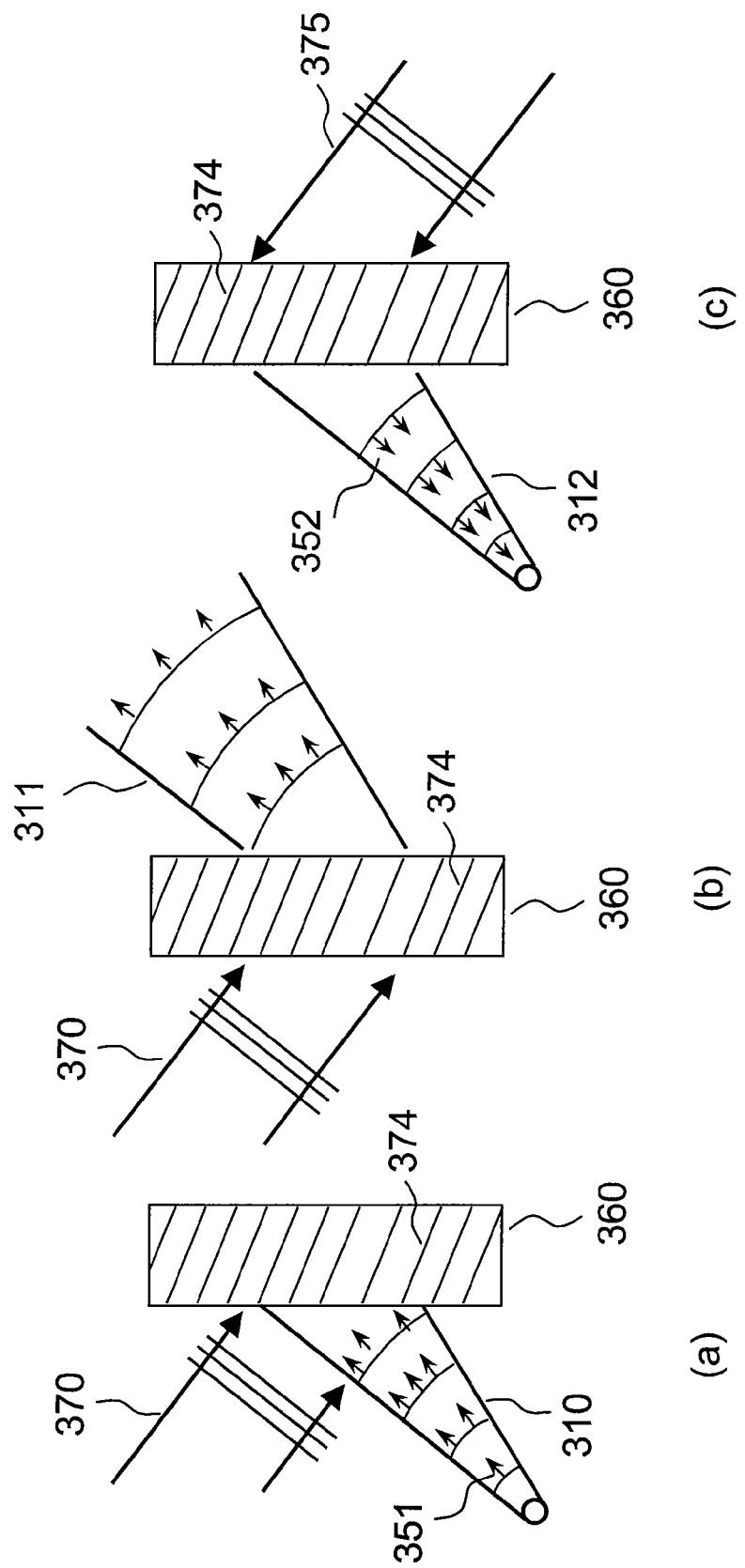
FIG. 3(a) illustrates a holographic recording arrangement.
FIG. 3(b) illustrates a reconstruction of a signal beam.
FIG. 3(c) illustrates an interaction of second beam and a holographic recording medium.

FIG. 3(a) illustrates a holographic approach to realize a phase conjugate mirror 260 shown earlier in FIG. 2(b). A signal beam 310 meets a holographic recording medium 360 in a presence of a first beam 370. The first beam 370 is typically a plane wave. The resulting interference pattern 374 represented by slanted lines is recorded inside the holographic recording medium 360.

FIG. 3(b) illustrates a reconstruction of a signal beam. The first beam 370 facilitates a reconstruction, on meeting the interference pattern 374 inside the holographic recording medium 360, of the signal beam 310 of FIG. 3(a) producing a reconstructed signal beam 311. In FIG. 3(b), small, multiple arrows indicate the direction whereas the curved lines represent the wavefront of the reconstructed signal beam 311. Moreover, in this case, the wavefront and direction of the reconstructed signal beam 311 are same as that of the original signal beam 310.

FIG. 3(c) illustrates an interaction of a second beam 375 and the interference pattern 374 inside the holographic recording medium 360, thereby forming the PCM. A conjugate signal beam 312 is generated in a direction opposite to that of the signal beam 310, which is indicated by the multiple small arrows 352 being in an opposite direction to that of the multiple small arrows 351 shown in FIG. 3(a). Moreover, the wavefront of the conjugate signal beam 312 is also reversed, i.e., equal and opposite to that of the signal beam 310.

Figure 4:
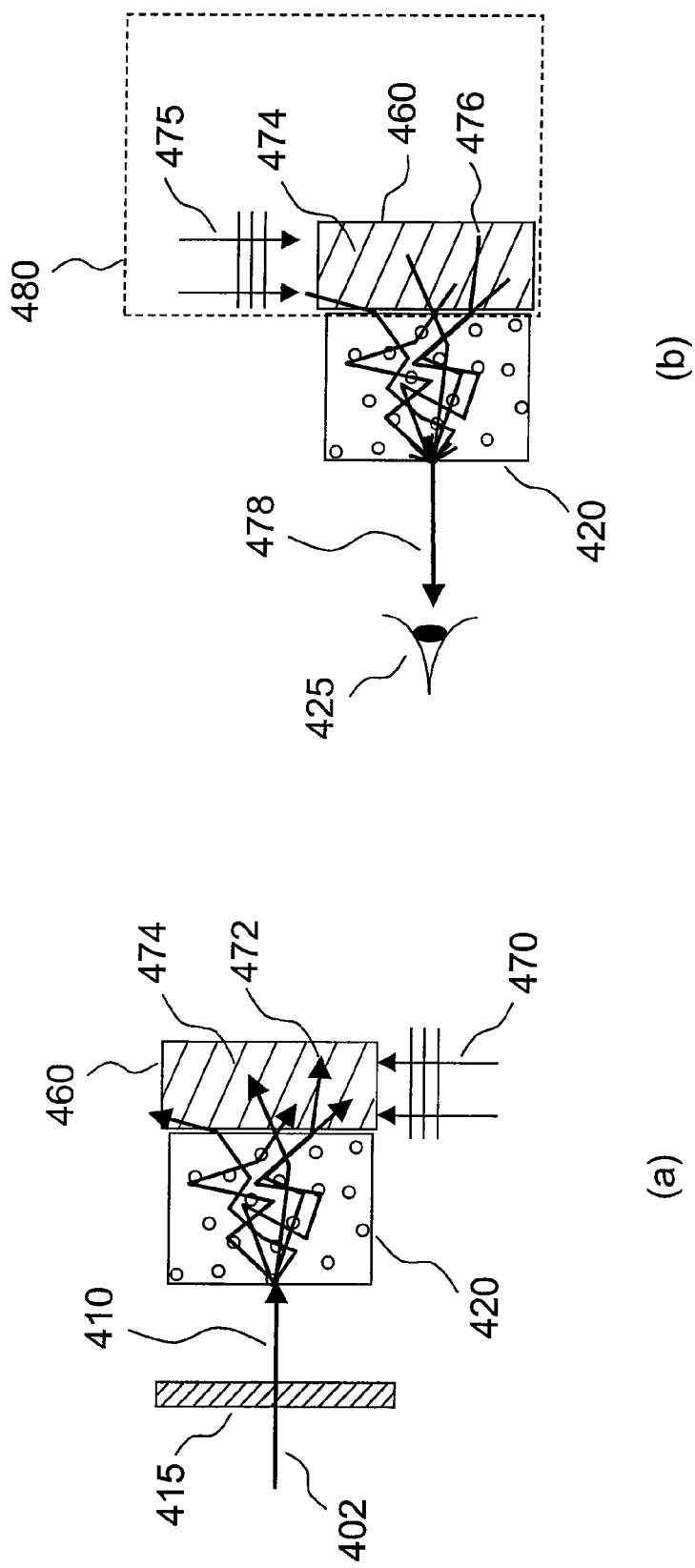
FIG. 4(a) illustrates a recording of an interference pattern by a system of present disclosure.
FIG. 4(b) illustrates a viewing of the interference pattern by the system of present disclosure.

FIG. 4(a) illustrates a recording of an image by a system of present disclosure. A first beam 470 having a direction enters a holographic recording medium 460. The first beam 470 is preferably a plane wave. An incoming beam 402 going through an illustrative target 415 generates a signal beam 410. A scattering medium 420, wherein the circles represent scattering locations, is illuminated by the signal beam 410 thereby generating at least one scattered beam 472 reaching the holographic recording medium 460. An interference pattern 474 is recorded in the holographic recording medium 460 from the at least one scattered beam 472. The interference pattern 474 may also be termed as a volume hologram or simply a hologram.

FIG. 4(b) shows an arrangement of viewing the information recorded in a holographic recording medium 460 in the form of an interference pattern 474. A second beam 475, preferably a plane wave, is generated substantially in a direction opposite to the direction of the first beam 470. The second beam 475 is configured to enter the holographic recording medium 460. The second beam 475 and the interference pattern 474 interact to generate at least one reconstructed beam 476 having a phase substantially opposite to a phase of the at least one scattered beam 472. As a result, the at least one reconstructed beam 478 is configured to reach a viewer 425 through the scattering medium 420.

The scattering medium 420 could be a biological tissue, a gas having one or more scattering particles, nanoshells, a material responding to or interacting with light, an optically absorptive material, or similar.

The holographic recording medium 460 may be a photorefractive crystal, which may be Lithium Niobate. Combined with the second beam 475, the holographic recording medium 460 forms a PCM 480.

Figure 5:
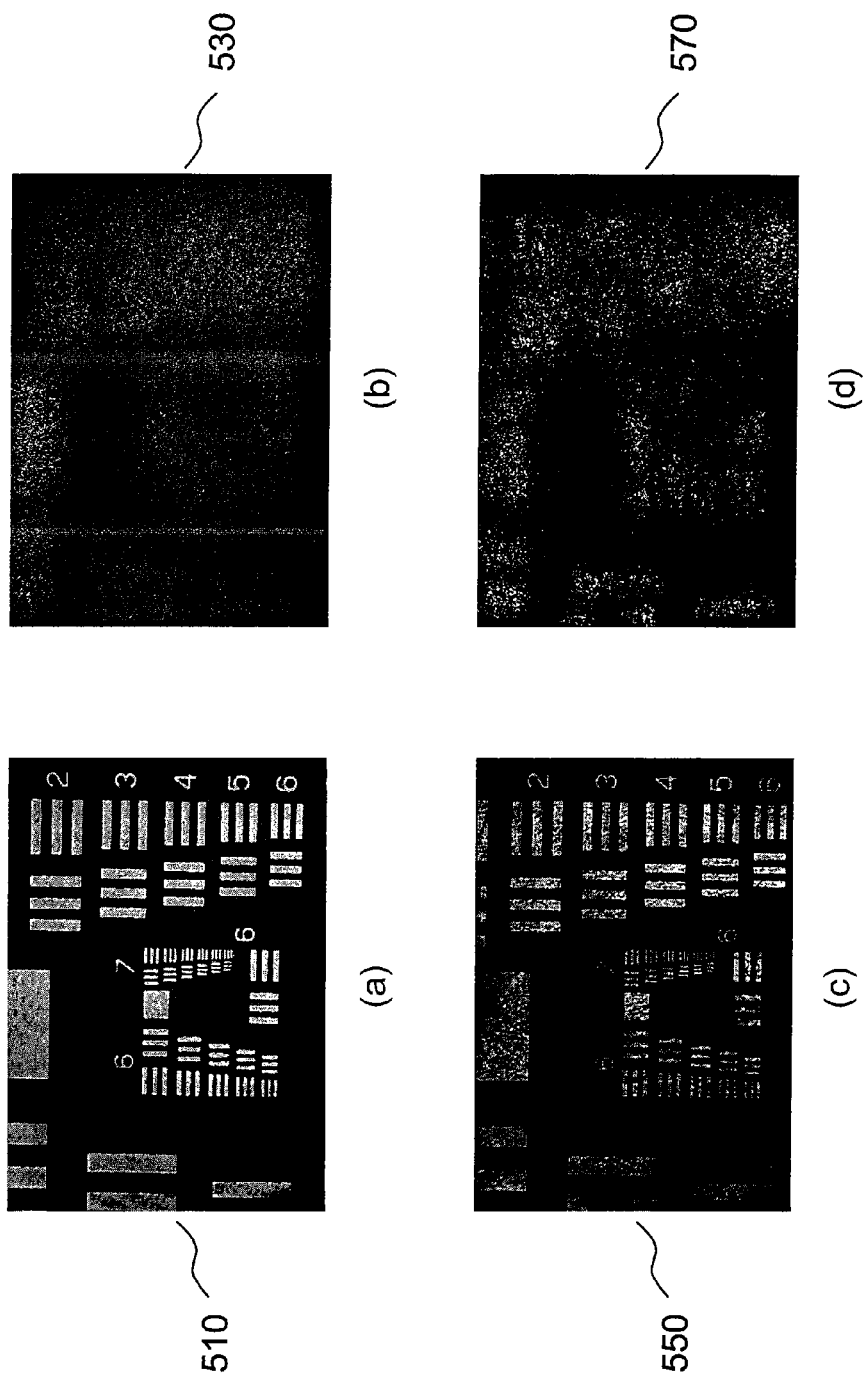
FIG. 5(a) shows an image of the illustrative target through a non-scattering medium.
FIG. 5(b) illustrates an image of the illustrative target through a scattering medium without phase processing.
FIG. 5(c) shows an image of the illustrative target reconstructed through a scattering medium using phase processing.
FIG. 5(d) shows reconstruction of an image of the illustrative target due to a suboptimal optical phase processing.

FIG. 5 compares images generated with and without optical phase processing.

FIG. 5(a) shows an image 510 of the illustrative target 415 through a non-scattering medium such as agarose.

FIG. 5(b) illustrates an image 530 of the illustrative target 415 through a scattering medium 420, such as a 460 micron-thick section of chicken breast tissue, without phase processing. A lack of phase processing does not prevent severe distortion of the wavefront of an incident light field, which results in an almost complete loss of spatial information of the illustrative target 415.

FIG. 5(c) shows the image 550 of the illustrative target 415 reconstructed through the scattering medium 420 using the second beam 475 in conjunction with the holographic recording material 460, wherein an interference pattern containing the spatial information of the illustrative target 415 has already been recorded. In this demonstration, the holographic recording medium 460 is a lithium niobate photorefractive crystal. The results shown here will remain valid for suitable holographic recording medium other than lithium niobate photorefractive crystal.

FIG. 5(d) shows a reconstruction of an image 570 of the illustrative target 415 due to a suboptimal optical phase processing. The suboptimal optical phase processing may be due to the second beam 475 having a direction and or wavefront different from the first beam 470 in a suboptimal manner, i.e., not in a substantially opposite direction, and due to a spatial disturbance in the scattering medium 420 between a time of recording and a time of reconstruction.

Figure 6:
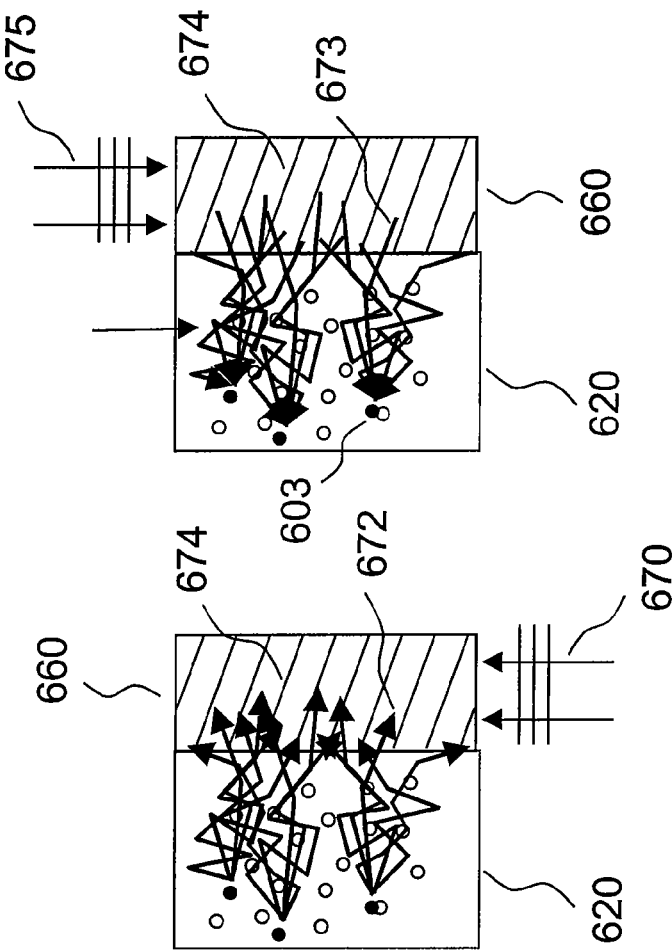
FIG. 6 shows a transmissive arrangement to illuminate a scatterer.
Figure 6:
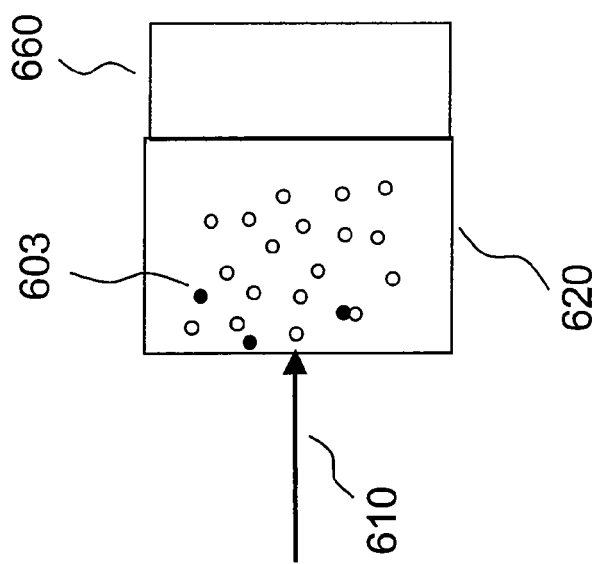

FIG. 6 shows a transmissive arrangement to illuminate a scatterer. The transmissive arrangement may also target a scatterer. In a three-step process, a signal beam 610 enters a scattering medium 620 including scatterers 603 in FIG. 6(a). Some of the scatterers 603 may be strong scatterers. The forward scattered beam 672 travels through the scattering medium 620 towards a holographic recording medium 660, as shown in FIG. 6(b). At least one scattered beam 672 is transmitted to the holographic recording medium 660 in a presence of a first beam 670, preferably a plane wave. An interference pattern 674 is recorded in the holographic recording medium 660 as described in FIG. 6(b). In a presence of a second beam 675, preferably a plane wave, oriented substantially in an opposite direction to the direction of the first beam 670, at least one reconstructed beam 673 is generated from the interference pattern 674. The reconstructed beam 673 travels through the scattering medium 620 to illuminate the scatterer 603.

Figure 7:
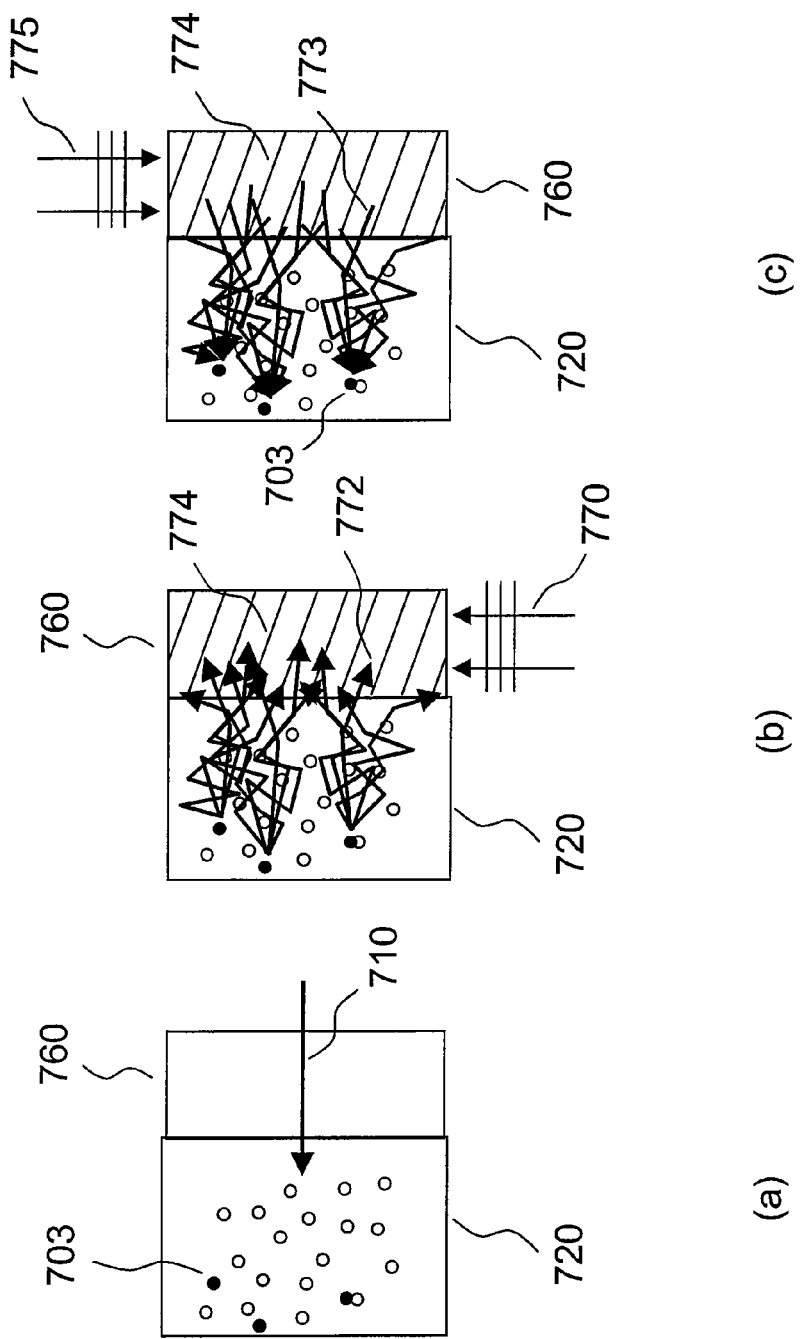
FIG. 7 shows a reflective arrangement to illuminate the scatterer.

FIG. 7 shows a reflective arrangement to illuminate the scatterer. The reflective arrangement may also target a scatterer. A signal beam 710 is configured to pass through a holographic recording medium 760 so as to reach at least one scatterer 703 inside the scattering medium 720, as shown in FIG. 7(a). Some of the scatterers 703 may be strong scatterers. In FIG. 7(b), a back scattered beam 772 from at least one scatterer 703 reaches the holographic recording medium 760. An interference pattern 774 is recorded by at least one light beam 772 in the presence of a first beam 770, preferably a plane wave, configured to enter the holographic recording medium 760. FIG. 7(c) shows a second beam 775, preferably a plane wave and having a direction opposite to that of first beam 770, interacting with the interference pattern 774 to generate at least one beam 773 that is conjugate of beam 772. The at least one reconstructed beam 773 travels through the scattering medium 720 to illuminate the at least one scatterer 703.

Figure 8:
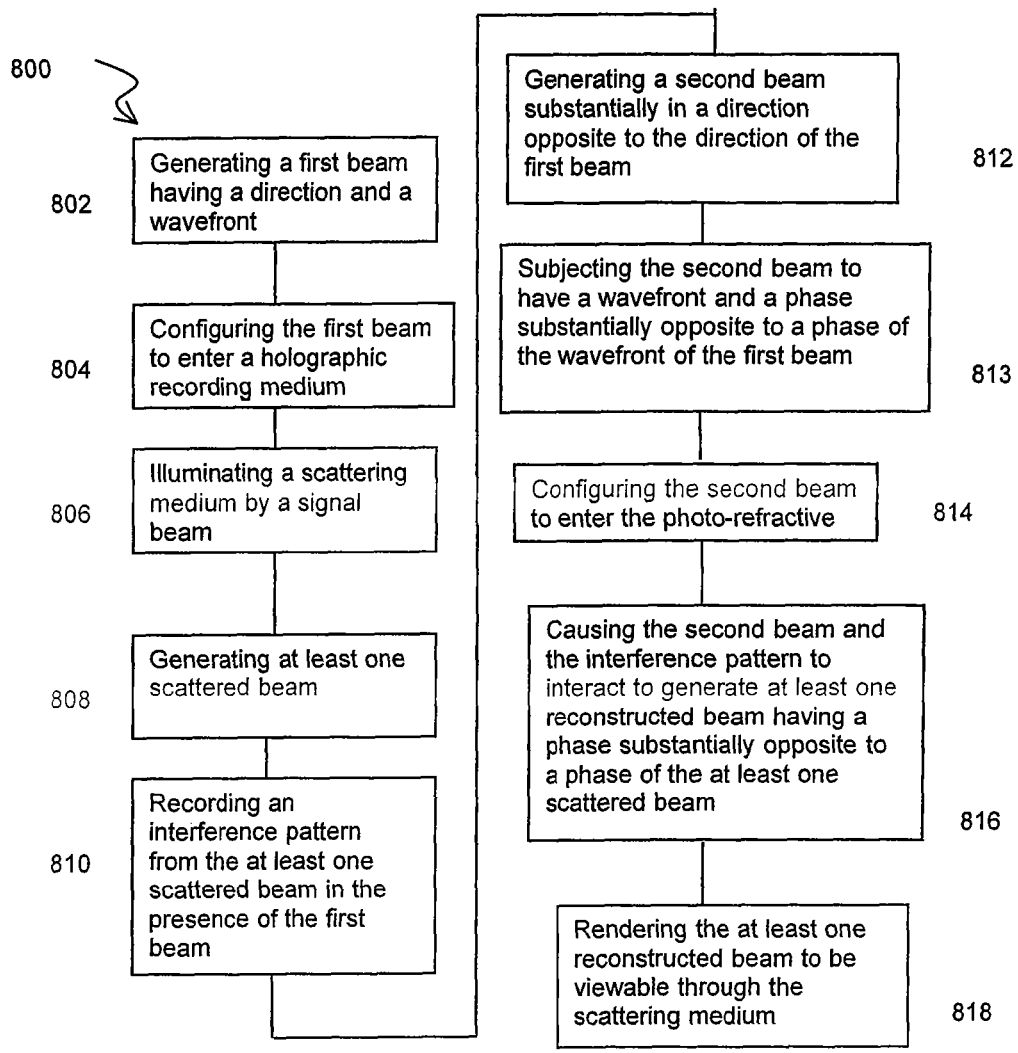
FIG. 8 shows a method of processing a phase of an optical wavefront in a scattering medium.

FIG. 8 shows a method 800 of processing an optical phase in a scattering medium. The method 800 includes generating a first beam having a wavefront and a direction (block 802), configuring the first beam to enter a holographic recording medium (block 804), illuminating a scattering medium by a signal beam (block 806), generating at least one scattered beam (block 808), and recording an interference pattern from the at least one scattered beam in the presence of the first beam (block 810). The method 800 may further include generating a second beam substantially in a direction opposite to the direction of the first beam (block 812), subjecting the second beam to have a wavefront and a phase substantially opposite to a phase of the wavefront of the first beam (block 813), configuring the second beam to enter the holographic recording medium (block 814), causing the second beam and the interference pattern to interact to generate at least one reconstructed beam having a phase substantially opposite to a phase of the at least one scattered beam (block 816), and rendering the at least one reconstructed beam to be viewable through the scattering medium (block 818). The at least one reconstructed beam may also be detectable through the scattering medium, or may be used to target strong scatterers within a scattering medium.

The method 800 may further include responding optically, or absorbing optically, or similar, in generating the at least one scattered beam.

Figure 9:
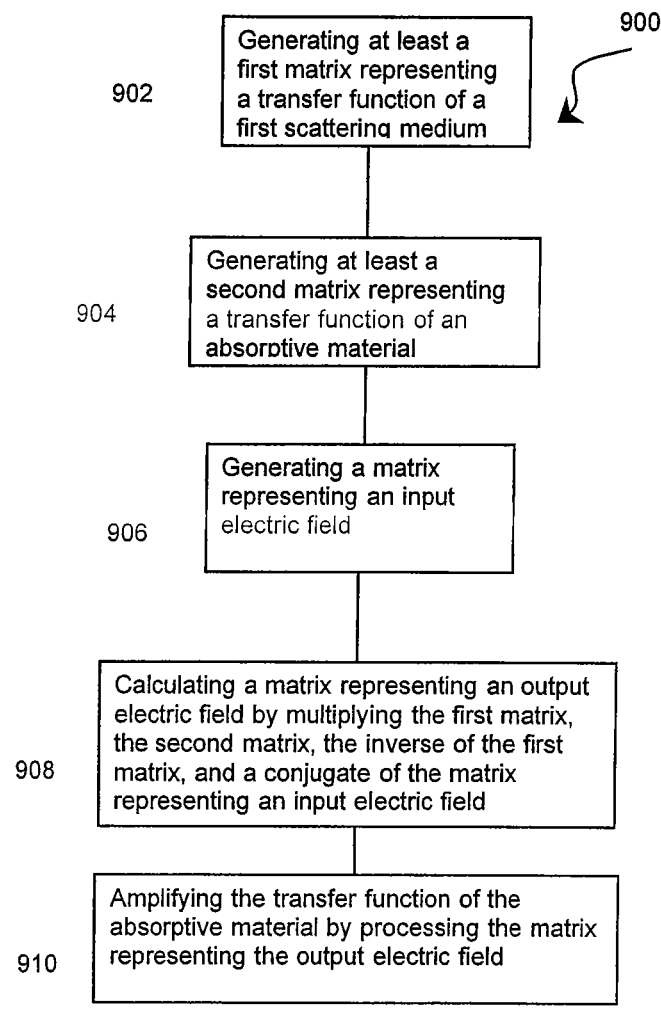
FIG. 9 shows a matrix-based method of processing the phase of an optical wavefront to assess weak absorption in a scattering medium.

FIG. 9 shows a matrix-based method 900 of processing an optical wavefront in a scattering medium. The method 900 includes generating at least a first matrix representing a transfer function of a first scattering medium (block 902), generating at least a second matrix representing a transfer function of an absorptive material (block 904), generating a matrix representing an input electric field (block 906) (at a first face 1060AA in FIG. 10 described below), calculating a matrix representing an output electric field (at the face 1060AA) by multiplying the first matrix, the second matrix, the inverse of the first matrix, and a conjugate of the matrix representing an input electric field (block 908), and amplifying the transfer function of the absorptive material by processing the matrix representing the output electric field (block 910). The result of block 910 is a physical parameter such as an optical property of the absorptive material, for example.

The method 900 may further include multiplying a third matrix representing a transfer function of a second scattering medium, the second matrix representing the absorptive material sandwiched between the first scattering medium and the second scattering medium, the first matrix, and the matrix representing an input electric field at the face 1060AA to determine the output electric field at face 1060CC. The method 900 may also include representing the output electric field at a face 1060CC (see FIG. 10, described below) in terms of the third matrix (representing the second scattering medium), raising the second matrix to a power of a number of passes (odd) through the composite material 1060, the first matrix representing the first scattering medium, and the input electrical field at the face 1060AA. Additionally, the method 900 may include representing the output electric field at face 1060AA in terms of the first matrix, raising the second matrix to a power of a number of passes (even) through the composite material 1060, the inverse of the first matrix, and conjugate of the input electrical field at face 1060AA.

Figure 10:
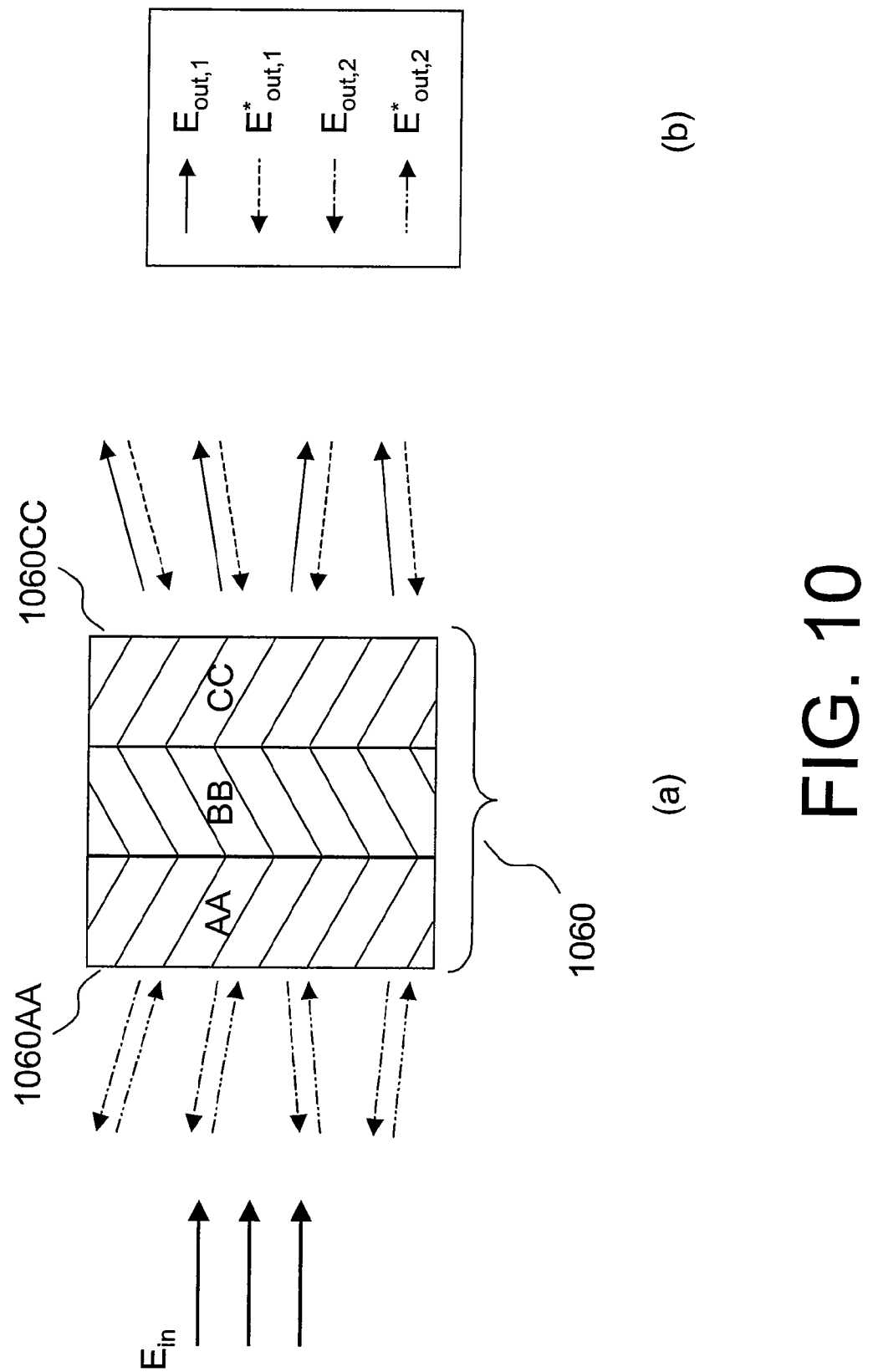
FIG. 10 shows an absorptive material sandwiched between two pieces of scattering media.

An example of boosting a weak absorptive property of biological tissue is demonstrated by performing the segments of method 900 in a repetitive manner. Light propagating through a slab of absorptive material BB sandwiched between two slabs AA and CC of scattering media is shown in FIG. 10. The two faces of a composite material 1060 are labeled as 1060AA and 1060CC. The input and output electric fields of light traversing the composite material 1060 can be described as follows:

$$\vec{E}_{out} = C \cdot B \cdot A \cdot \vec{E}_{in},$$

where A and C represent the transfer functions associated with the scattering media slabs AA and CC and B represents the transfer function for the absorptive material BB. After recording output electric field using a holographic recording medium, and viewing the conjugate electric field at each face of the composite material, the final output electric field may be calculated after multiple passes through AA, BB, and CC. An assumption is made that the scattering media slabs AA and CC are lossless. Further, it is assumed that light that exits the materials is collected by the holographic recording medium. Due to a constraint of transposal symmetry ($A^T = A$, $B^T = B$, $C^T = C$) placed on the three transfer function matrices, both input and conjugate electric fields $E_{in}$ and $E_{out}$ see or encounter equivalent transfer matrices. Further, conservation of energy implies that $A^\dagger = A^{-1}$ which permits equating the conjugate scattering medium matrix with its inverse ($A^* = (A^T)^* = A^\dagger = A^{-1}$). A similar situation holds for the second scattering medium slab CC. A further assumption is that absorption in the composite material 1060 will be equivalent when illuminated with either the input electric field $E_{in}$ or complex conjugate of input electric field E. The output electric field $E_{out}$ after multiple passes can be expressed as:

$$\vec{E}_{out,2} = A^T \cdot B^T \cdot C^T \cdot \vec{E}^*_{out,1}$$
$$= A^T \cdot B^T \cdot C^T \cdot C^* \cdot B^* \cdot A^* \cdot \vec{E}^*_{in}$$
$$= A \cdot B \cdot C \cdot C^{-1} \cdot B \cdot A^{-1} \cdot \vec{E}^*_{in}$$
$$= A \cdot B^2 \cdot A^{-1} \cdot \vec{E}^*_{in}$$

$$\vec{E}_{out,3} = C \cdot B \cdot A \cdot \vec{E}_{out2}$$
$$= C \cdot B^3 \cdot A \cdot \vec{E}_{in}$$

$$\vec{E}_{out,4} = A^T \cdot B^T \cdot C^T \cdot \vec{E}^*_{out3}$$
$$= A \cdot B^4 \cdot A^{-1} \cdot \vec{E}^*_{in}$$

$$\vec{E}_{out,n} = C \cdot B^n \cdot A \cdot \vec{E}_{in} \quad n \text{ odd}$$
$$= A \cdot B^n \cdot A^{-1} \cdot \vec{E}^*_{in} \quad n \text{ even}$$

where n represents the number of passes through the composite material. In this manner, the effect of absorptive material is amplified, without similarly amplifying the effective contribution of the scattering media. This technique would allow for the examination of very weakly absorptive material included in a scattering medium.

Further, if the scattering media AA and CC are not completely lossless, i.e., part of the scattered light is lost, e.g., to the sides (see FIG. 12), before reaching the face 1060AA or 1060CC for recording, the conservation of energy condition $A^\dagger = A^{-1}$ will not be met, resulting in a decrease in strength of the conjugate electric field produced at faces 1060AA and 1060CC.

As a person having ordinary skill in the art would appreciate, the elements or blocks of the methods described above could take place at the same time or in an order different from the described order.

Figure 11:
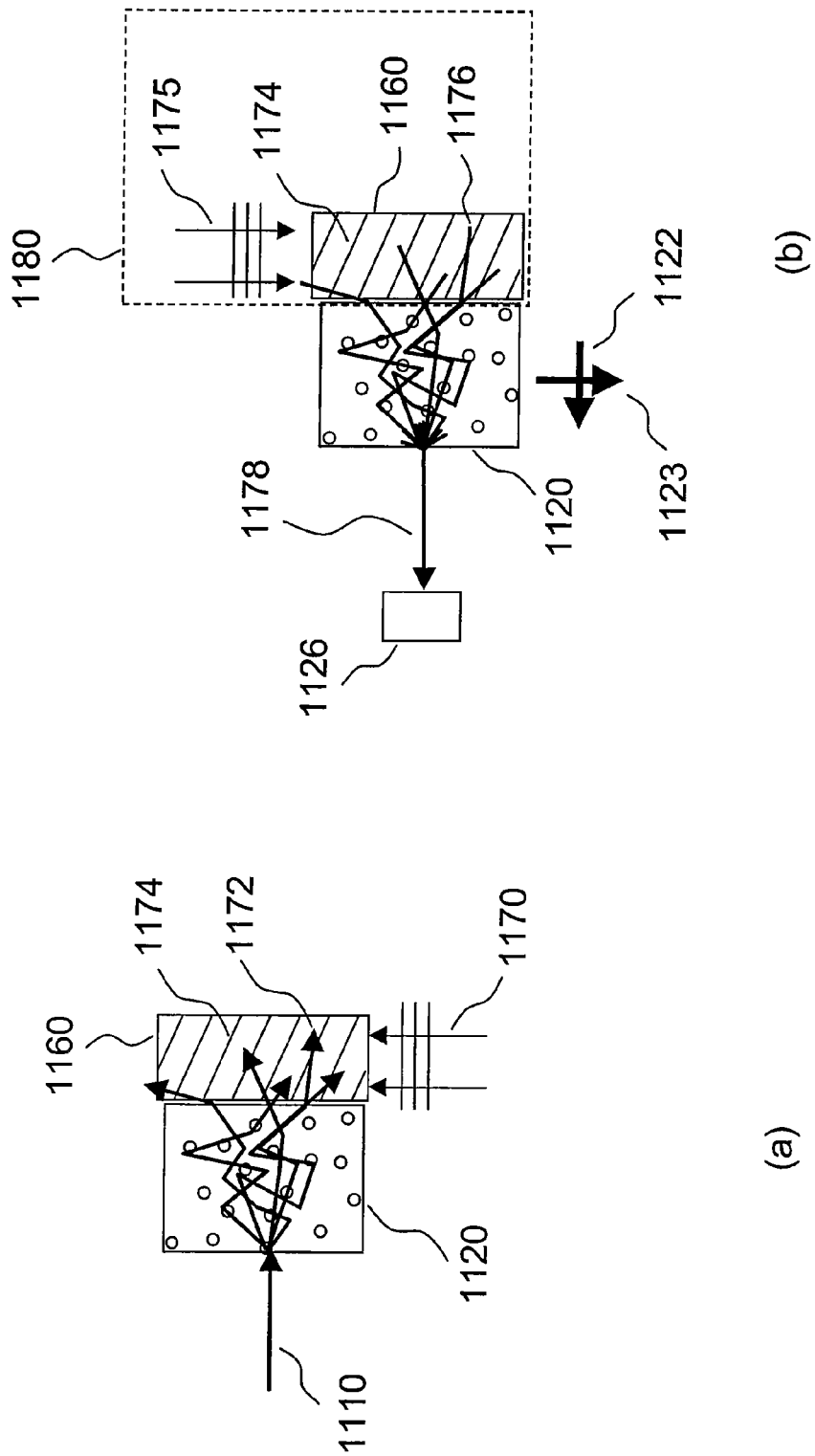
FIG. 11 shows an assessment of inhomogeneity in the scattering medium.

FIG. 11 shows an assessment of inhomogeneity in a scattering medium. FIG. 11(a) shows a signal beam 1110 entering the scattering medium 1120 generating at least one scattered beam 1172 that is recorded as an interference pattern 1174 in a holographic recording medium 1160 in a presence of a first beam 1170, preferably a plane wave and configured to enter the holographic recording medium 1160.

In FIG. 11(b), a second beam 1175, preferably a plane wave and configured to enter the holographic recording medium 1160 in a direction opposite to that of the first beam 1170, interacts with the recorded interference pattern 1174 to generate at least one beam 1176 that is phase conjugate of beam 1172. If the scattering medium 1120 has not spatially changed during the recording and reconstruction processes, the beam 1176 will follow the path of at least one scattered beam 1172 and form a reconstructed beam 1178, similar in construction as signal beam 1110.

In the above method, it may also be possible to shift or displace the scattering medium 1120 in the axial 1122, or lateral 1123 directions, or a combination of the two, in order to cause a mismatch between the phase conjugate beam 1176, leaving the holographic recording medium 1160, and the scattering centers and or scattering structures inside the scattering medium 1120. Such a mismatch between phase conjugate beam 1176 and scattering medium 1120 may degrade the reconstruction beam 1178 in terms of signal strength and spatial quality. Further, knowledge of such degradation may be used to assess certain scattering characteristics of the scattering medium 1120. This may include an extent of scattering, e.g., strong or weak scattering, inhomogeneity in the scattering medium 1120, thickness of the scattering medium 1120, or similar. Moreover, such inhomogeneity may also indicate a biological condition, such as a disease or an abnormality.

Figure 12:
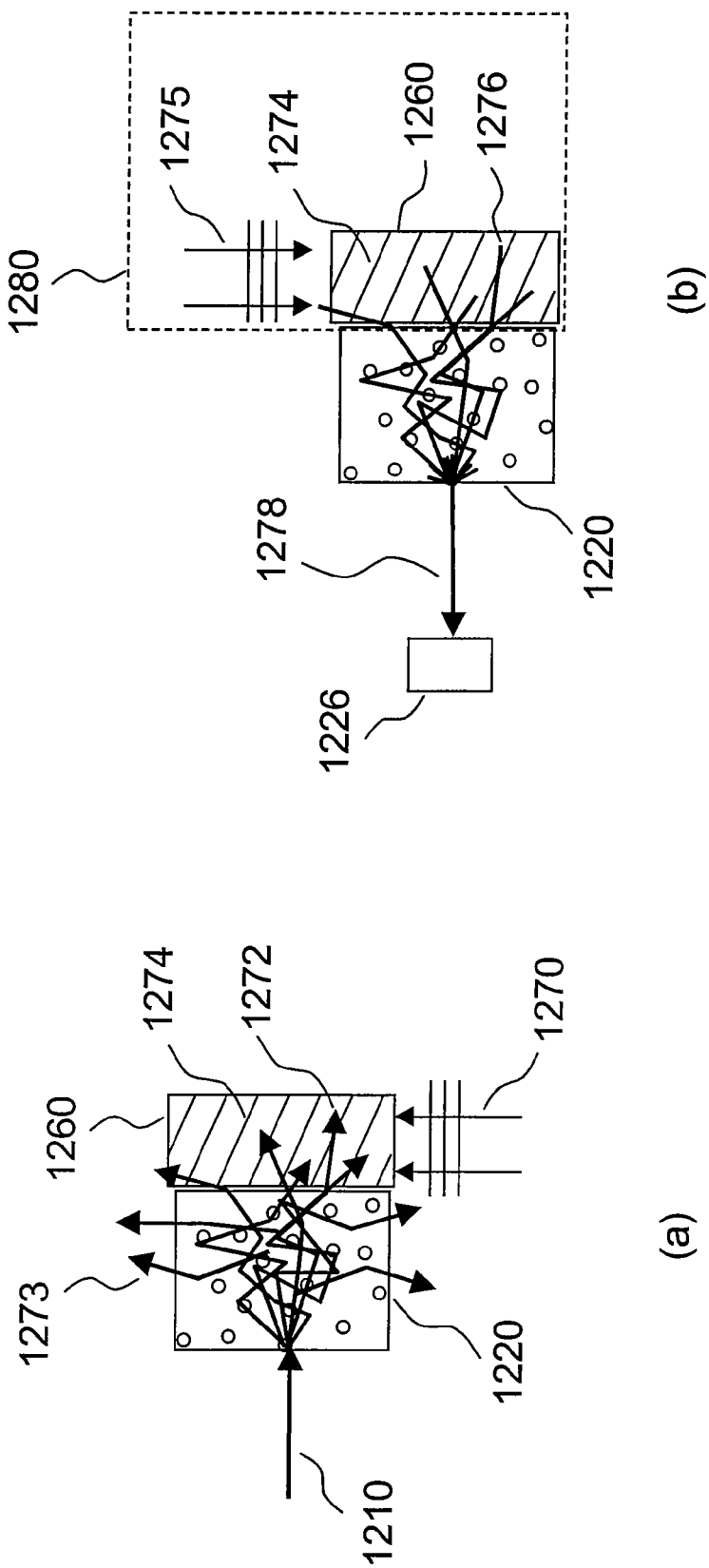
FIG. 12 shows a scattered beam diverted from a recording medium.

It is expected that some light may be lost due to absorption and light scattering in directions away from the holographic recording medium 1260. FIG. 12 shows at least one scattered beam 1273 diverted from the holographic recording medium 1260. FIG. 12 may also demonstrate an assessment of inhomogeneity in the scattering medium 1220. Further, the scattered light beam 1272 will record an interference pattern 1274 in the presence of the first beam 1270. Since information has been lost due to at least one scattered beam 1273 that did not reach the holographic medium 1260, the interference pattern 1274 will be partly recorded.

During a playback or a reconstruction, the at least one of a plurality of scattered beams 1273, which did not take part in holographic recording, will not take part in reconstruction for the reason of being diverted from a recording medium 1260. Further, the reconstructed phase conjugated beam 1276 entering back into the scattering medium 1220 will be incomplete, as it does not have all the information of the scattering medium 1220. As a result, the reconstructed beam 1278 reaching the detector 1226 will not be usable in terms of reconstructing beam strength or spatial features or both. The factor that may affect the quality of reconstructed beam 1278 include thickness of scattering medium 1220, extent of scattering (i.e., strong or weak), nature of scattering (i.e., highly forward, backward, isotropic), the inhomogeneity of scattering medium 1220, or the same. Therefore, the imperfections in the reconstructed beam 1278 may be used to evaluate the scattering characteristics in a scattering medium 1220.

Figure 13:
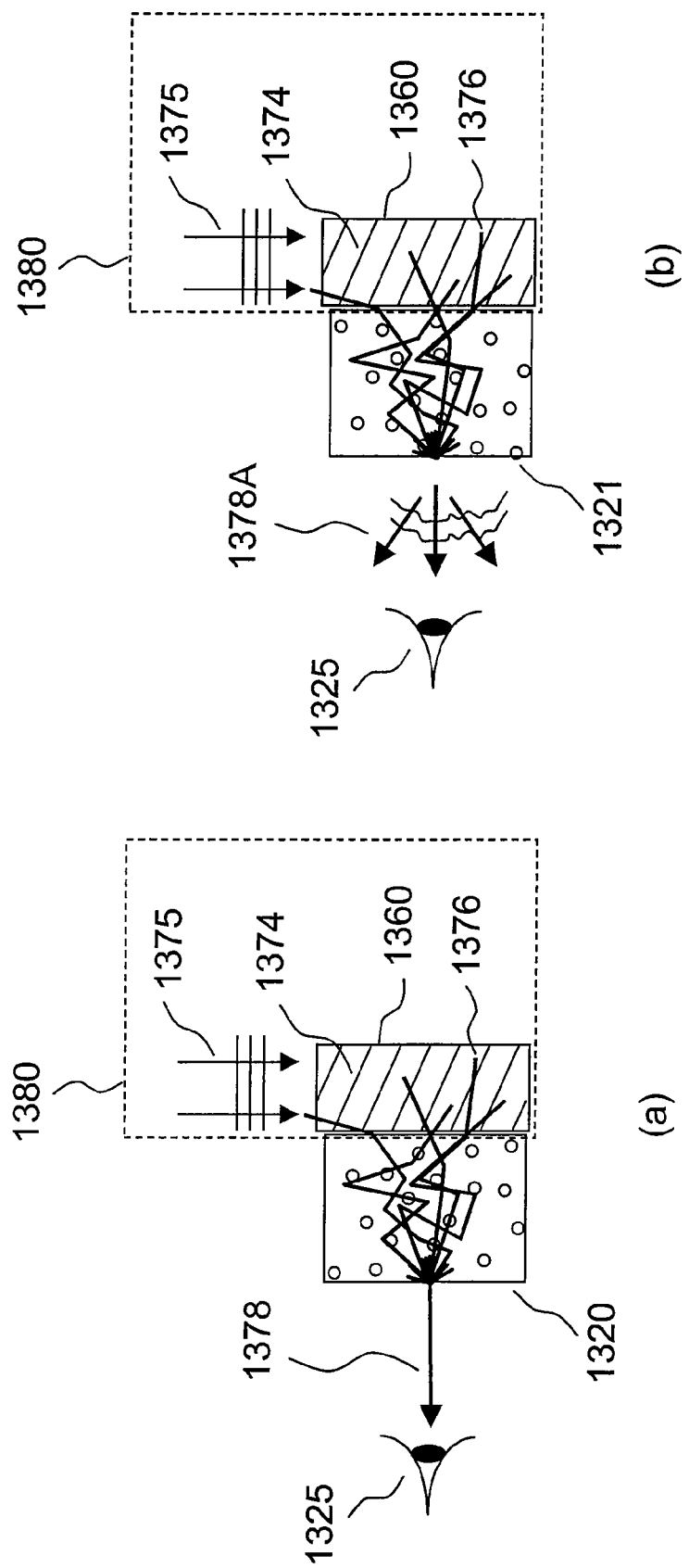
FIG. 13 shows indicating an information representing the scattering medium.

FIG. 13 shows at least two ways in which the present disclosure may be useful for processing the spatial and or time varying information of the scattering medium 1320. An interference pattern 1374, recorded in the manner explained before, bears an information representing the scattering medium 1320. This information may be used to identify the scattering medium 1320 itself or track/observe changes occurring in the scattering medium in time. The information recorded as an interference pattern 1374 may also be used as an encryption information, thus processing information in a manner such that it is accessible only by a selected viewer, detector, or a similar transducer. The encryption information may be processed to obtain an encryption key pertaining to one or more scattering media.

Applications in Biomedicine

Targeting Strong Scatterers in Tissue

The results shown in the previous sections illustrate the ability of OPC to eliminate turbidity in scattering samples. This allows us to devise a method to effectively target strong scatterers such as nano shells (inside biological tissues). Moreover, the strong scatterers can be potentially attached to absorbing dye molecules or some other light activated molecules such as cancer markers or a cancer drug.

FIG. 6 illustrates the three-step approach to target strong scatterers in tissue. As a first step, the sample is illuminated with a weak illumination. In the second step, the backscattered component reaches the holographic material (such as a photorefractive crystal) where its amplitude and phase information is recorded in the presence of a reference beam. During the third step, a conjugated reference beam is used to activate the PCM; the phase conjugated beam will retrace its path in the tissue to target the strong scatterers inside tissue. Hence, optical phase conjugation provides means to concentrate light to only the regions of interest.

The applications of this powerful technique include photodynamic therapy, neuron activation, portwine stain removal, zapping floaters in the eye, tattoo removal, or basically any situation where it is desired to concentrate/focus light on strong scatterers in the tissue.

Tissue Absorption Amplification

A method for boosting the weak absorptive properties of biological tissue, by performing the above steps of FIG. 6 in a repetitive manner, is also described above (see e.g., FIG. 10 and associated text). A simple matrix-based approach may be used to analyze the results/output (see, e.g., FIG. 9 and associated text).

It should be emphasized that the above-described embodiments are merely some possible examples of implementation, set forth for a clear understanding of the principles of the invention. Many variations and modifications may be made to the above-described embodiments of the invention without departing substantially from the principles of the invention. All such modifications and variations are intended to be included herein within the scope of this invention and the present invention and protected by the following claims.

What is claimed is:

1. A method for illuminating biological tissue, comprising:
   (a) illuminating one or more scatterers in biological tissue with an illuminating beam to produce a scattered beam;
   (b) generating a reconstructed beam that is a phase conjugate of the scattered beam; and
   (c) forming multiple passes of the reconstructed beam through the biological tissue, by repeating steps (a)-(b) using the reconstructed beam formed in step (b) as the illuminating beam in step (a), wherein the reconstructed beam travels through the biological tissue, illuminating and targeting the one or more scatterers in the biological tissue.

2. The method of claim 1, wherein:
   the one or more scatterers are such that scattering of the illuminating beam by the one or more scatterers is 10 times or more stronger than absorption of the illuminating beam by one or more absorbers in the biological tissue; and
   the multiple passes amplify the absorption of the biological tissue allowing examination of the absorbers.

3. The method of claim 1, further comprising:
   displacing the biological tissue to cause a mismatch between the reconstructed beam and the one or more scatterers inside the biological tissue, wherein the displacing is in an axial direction, a lateral direction, or a combination of the axial direction and the lateral direction.

4. The method of claim 3, further comprising assessing, from the mismatch, one or more of an extent of scattering in the biological tissue, a type of scattering in the biological tissue, a scattering inhomogeneity of the biological tissue, a thickness of the biological tissue, and a biological disease or abnormality of the biological tissue.

5. The method of claim 1, wherein the targeting concentrates or focuses the reconstructed beam on the one or more scatterers to perform therapy on, remove tissue at, or activate one or more regions of interest in the biological tissue.

6. The method of claim 5, wherein the regions of interest comprise one or more floaters in an eye and the targeting concentrates or focuses the reconstructed beam to zap the one or more floaters in the eye.

7. The method of claim 5, wherein the regions of interest comprise a portwine stain and the targeting concentrates or focuses the reconstructed beam to remove the portwine stain.

8. The method of claim 5, wherein the regions of interest comprise a tattoo and the targeting concentrates or focuses the reconstructed beam to remove the tattoo.

9. The method of claim 5, wherein the targeting concentrates or focuses the reconstructed beam on one or more cancer drugs attached to the one or more scatterers, and performs the therapy comprising photodynamic therapy on the one or more regions of interest.

10. The method of claim 1, wherein the targeting concentrates or focuses the reconstructed beam on one or more light activated molecules attached to the one or more scatterers.

11. The method of claim 1, wherein the phase conjugate is an optical phase conjugate of the scattered beam.

12. The method of claim 1, further comprising generating the reconstructed beam with a phase conjugate mirror by reflecting the scattered beam off the phase conjugate mirror.

13. The method of claim 12, wherein the phase conjugate mirror comprises a holographic recording medium, the method further comprising generating the reconstructed beam by:
   (1) recording an interference pattern in a holographic recording medium, wherein the interference pattern is formed from the scattered beam in a presence of a first beam; and
   (2) interacting a second beam, having a direction opposite to the first beam, with the interference pattern, to create the reconstructed beam that is the conjugate of the scattered beam.

14. The method of claim 12, wherein the phase conjugate mirror comprises a photorefractive crystal.

15. An apparatus for illuminating biological tissue, comprising:

two phase conjugate generators, wherein:
(1) one or more scatterers in biological tissue are illuminated with an illuminating beam to produce a scattered beam;
(2) the phase conjugate generators generate a reconstructed beam that is a phase conjugate of the scattered beam; and
(3) the biological tissue is positioned in between the two phase conjugate generators forming multiple passes of the reconstructed beam through the biological tissue by repeating functions (1)-(2) using the reconstructed beam formed in (2) as the illuminating beam in (1), wherein the reconstructed beam travels through the biological tissue, illuminating and targeting the one or more scatterers in the biological tissue.

16. The apparatus of claim 15, wherein the targeting concentrates or focuses the reconstructed beam on the one or more scatterers to perform therapy on, remove tissue at, or activate one or more regions of interest in the biological tissue.

17. The apparatus of claim 16, wherein the targeting concentrates or focuses the reconstructed beam on:
one or more cancer drugs attached to the one or more scatterers, and performs the therapy comprising photodynamic therapy on the one or more regions of interest, or
one or more light activated molecules attached to the one or more scatterers.

18. The apparatus of claim 15, wherein the phase conjugate is an optical phase conjugate of the scattered beam.

19. The apparatus of claim 15, wherein the conjugate generators are phase conjugate mirrors and the reconstructed beam is formed by reflecting the scattered beam off the phase conjugate mirrors.

20. The apparatus of claim 15, wherein:
the one or more scatterers are such that scattering of the illuminating beam by the one or more scatterers is 10 times or more stronger than absorption of the illuminating beam by one or more absorbers in the biological tissue; and
the multiple passes amplify the absorption of the biological tissue allowing examination of the absorbers.

* * * * *